(12) United States Patent
Farmer et al.

(10) Patent No.: US 12,338,050 B2
(45) Date of Patent: Jun. 24, 2025

(54) SCORED CANDY BAR WRAPPER AND METHOD OF OPENING SAME

(71) Applicant: THE HERSHEY COMPANY, Hershey, PA (US)

(72) Inventors: Joel Farmer, Annville, PA (US); William J. Hendricks, Elizabethtown, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 474 days.

(21) Appl. No.: 17/756,384

(22) PCT Filed: Dec. 17, 2020

(86) PCT No.: PCT/US2020/065518
§ 371 (c)(1),
(2) Date: May 24, 2022

(87) PCT Pub. No.: WO2021/127121
PCT Pub. Date: Jun. 24, 2021

(65) Prior Publication Data
US 2022/0411159 A1    Dec. 29, 2022

Related U.S. Application Data

(60) Provisional application No. 62/950,263, filed on Dec. 19, 2019.

(51) Int. Cl.
*B65D 75/58* (2006.01)
*A23G 1/50* (2006.01)
*B65B 61/02* (2006.01)

(52) U.S. Cl.
CPC ........... *B65D 75/5888* (2013.01); *A23G 1/50* (2013.01); *B65B 61/02* (2013.01)

(58) Field of Classification Search
CPC ......... B65B 61/02; B65B 61/04; B65B 61/06; B65B 61/00; B65B 2220/06; B65D 75/5888; A23G 1/50
(Continued)

(56) References Cited

U.S. PATENT DOCUMENTS 1,359,895 A  *  11/1920  Inglis ................... B65D 5/5445
                                              229/235
1,869,584 A  *   8/1932  Reymond ............... B65B 11/00
                                              229/87.08
(Continued)

FOREIGN PATENT DOCUMENTS

EP       2589547 A1    5/2013
GB       2492997 A     1/2013
WO    2016151355 A1    9/2016

*Primary Examiner* — Sameh Tawfik
(74) *Attorney, Agent, or Firm* — McNees Wallace & Nurick LLC (57) ABSTRACT

A process of forming a candy bar wrapper includes forming a primary score line in a film material and cutting the film material to form the candy bar wrapper. The primary score line extends in a predetermined direction. The film material comprising at least one film layer, a film thickness, a first film surface, and a second film surface opposite the first film surface. The candy bar wrapper has a film length, a film width from a first end of the candy bar wrapper to a second end of the candy bar wrapper. The primary score line is located to permit the simultaneous breaking of a candy bar and splitting of the candy bar wrapper to separate the candy bar wrapper into two pieces in a wrapped candy bar product. A candy bar wrapper and a wrapped candy bar product are also disclosed.

29 Claims, 8 Drawing Sheets

(58) Field of Classification Search
USPC .......................................... 53/435; 493/369
See application file for complete search history.

(56) References Cited

U.S. PATENT DOCUMENTS

| | | | | |
|---|---|---|---|---|
| 2,113,886 A * | 4/1938 | Greenwood | ......... | B65D 5/5445 |
| | | | | 229/243 |
| 2,596,620 A * | 5/1952 | Townsend | ............. | B65B 61/182 |
| | | | | 229/87.08 |
| 3,130,058 A * | 4/1964 | Johnson | ................ | B65D 75/54 |
| | | | | 426/106 |
| 3,216,562 A * | 11/1965 | Lockwood | ........... | B65D 75/585 |
| | | | | 206/532 |
| 3,472,368 A * | 10/1969 | Hellstrom | ............. | B65D 75/32 |
| | | | | 206/469 |
| 3,473,650 A * | 10/1969 | Hoag | ..................... | B65D 83/06 |
| | | | | 426/115 |
| 3,692,175 A * | 9/1972 | Hordler | ................ | B65D 75/366 |
| | | | | 206/470 |
| 4,155,454 A * | 5/1979 | Ryden | ................. | B65D 75/527 |
| | | | | 206/532 |
| 4,611,715 A * | 9/1986 | Redmond | ............ | B65D 75/368 |
| | | | | 222/107 |
| 4,658,963 A | 4/1987 | Jud | | |
| 4,666,079 A * | 5/1987 | Bolli | ..................... | B65D 75/14 |
| | | | | 229/87.08 |
| 5,934,809 A | 10/1999 | Marbler | | |
| 7,270,239 B1 * | 9/2007 | Ross | ................. | A46B 11/0003 |
| | | | | 206/823 |
| 7,531,228 B2 | 5/2009 | Perre et al. | | |
| 8,028,837 B2 * | 10/2011 | Gerstle | ................ | B65D 75/585 |
| | | | | 221/45 |
| 8,910,817 B1 * | 12/2014 | Kanderka | ............. | B65D 75/48 |
| | | | | 220/276 |
| 9,630,761 B2 * | 4/2017 | Willey | ............... | B65D 75/5833 |
| 11,964,810 B2 * | 4/2024 | Redrup | ............... | B65D 75/585 |
| 2002/0068668 A1 | 6/2002 | Chow et al. | | |
| 2006/0093711 A1 | 5/2006 | Bialick et al. | | |
| 2007/0241024 A1 * | 10/2007 | Perell | .................... | B65D 75/328 |
| | | | | 206/531 |
| 2008/0273821 A1 | 11/2008 | Dull | | |
| 2009/0190866 A1 | 7/2009 | Hughes | | |
| 2010/0019020 A1 | 1/2010 | Phung et al. | | |
| 2010/0065582 A1 * | 3/2010 | Nelson | .................... | B65D 51/00 |
| | | | | 206/459.5 |
| 2010/0116772 A1 * | 5/2010 | Teys | ..................... | A47G 21/004 |
| | | | | 206/484 |
| 2011/0049158 A1 * | 3/2011 | Bouthiette | ............... | B32B 3/30 |
| | | | | 220/359.3 |
| 2011/0297681 A1 | 12/2011 | Bowers | | |
| 2012/0180947 A1 | 7/2012 | Hada et al. | | |
| 2012/0288660 A1 | 11/2012 | Maseiker et al. | | |
| 2013/0292458 A1 | 11/2013 | Cheema et al. | | |
| 2013/0330446 A1 | 12/2013 | Onogi et al. | | |
| 2014/0121800 A1 | 5/2014 | Morgana et al. | | |
| 2015/0136639 A1 * | 5/2015 | Aranda Lopez | ....... | B65D 75/22 |
| | | | | 53/473 |
| 2016/0176601 A1 | 6/2016 | Boekeloo et al. | | |
| 2017/0166379 A1 * | 6/2017 | Larsen | ................ | B65D 75/366 |

* cited by examiner

SCORED CANDY BAR WRAPPER AND METHOD OF OPENING SAME

CROSS-REFERENCE TO RELATED APPLICATIONS

This application claims priority to and the benefit of U.S. Provisional Application No. 62/950,263, filed Dec. 19, 2019, which is hereby incorporated by reference in its entirety.

FIELD OF THE INVENTION

This application is directed to easy-to-open packaging for comestible items and methods of opening easy-to-open packaging for comestible items. More specifically, this application is directed to scored candy bar wrappers and methods of opening scored candy bar wrappers, such as where the package permits easy sharing without needing to touch the packaged item itself.

BACKGROUND OF THE INVENTION

Candy bars are conventionally wrapped in a film wrapper that, while thin, does not split or tear when applying a force to the wrapped candy bar product sufficient to break the candy bar into two or more pieces. In order for the candy bar to be divided up, such as for sharing or eating only a portion of the bar, the wrapper generally must be cut or pulled apart either at one of the ends or along a fin seal in the back of the wrapper of the wrapped candy bar product in order to access and/or give all or any portion of the candy bar.

Film wrappers for candy bars are conventionally mass-produced on an automated production line from a web of film material, with the wrapping and sealing of the wrapped candy bar product also being automated, a process conventionally called flow wrapping. The web undergoes significant tension in the direction of travel that requires at least a certain minimum level of film strength to prevent the film material from tearing during formation of the candy bar wrapper and the wrapped candy bar product.

It would be desirable to provide a wrapped candy bar product, where the candy bar wrapper breaks with the breakage of the candy bar while the wrapped candy bar product is in the wrapped state.

BRIEF DESCRIPTION OF THE INVENTION

Exemplary embodiments are directed to candy bar wrappers formed of a film material on a web that permit a consumer to open a wrapped candy bar while simultaneously breaking the candy bar within the wrapper.

Exemplary embodiments are directed to wrapped candy bars that permit the consumer to share the candy bar by breaking the candy bar in two while simultaneously splitting the candy bar wrapper.

Some exemplary embodiments are directed to sharable wrapped chocolate bars, such as, for example, a milk chocolate bar, a dark chocolate bar, or other similar confections.

Exemplary embodiments employ a primary score line to promote the splitting of a candy bar wrapper, secondary score lines to facilitate tear initiation along a primary score line, and an unscored section to provide strength to a candy bar wrapper during a flow wrapping process.

Among the advantages of certain exemplary embodiments are the ability of a manufacturer to form a wrapped candy bar product by conventional web processing of the wrapper while providing score marks on the candy bar wrapper, the ability of a user to simultaneously break a candy bar and split a candy bar wrapper, and the ability of a consumer to easily share part of a wrapped candy bar without needing to touch the candy bar itself and without needing a tool, such as a cutting tool, such as a knife or scissors.

In an embodiment, a process forms a candy bar wrapper for wrapping a candy bar having a predetermined size. The process includes forming a primary score line in a film material. The primary score line extends in a predetermined direction perpendicular to an edge of the candy bar in a wrapped candy bar product. The film material includes at least one film layer, a film thickness, a first film surface, and a second film surface opposite the first film surface. The process also includes cutting the film material to form the candy bar wrapper. The candy bar wrapper has a film length and a film width from a first end of the candy bar wrapper to a second end of the candy bar wrapper. The primary score line is located to permit simultaneously breaking of the candy bar and splitting of the candy bar wrapper to separate the candy bar wrapper into two pieces in the wrapped candy bar product.

In another embodiment, a candy bar wrapper includes a film material including at least one film layer. The film material has a film length, a film width from a first end of the film material to a second end of the film material, a film thickness, a first film surface, a second film surface opposite the first film surface, and a primary score line extending in a width direction. The primary score line includes a plurality of primary cut segments alternating with a plurality of primary uncut gaps. Each of the primary cut segments extends through the first film surface and partially into the film material. The primary score line begins a first distance from the first end and terminates a second distance from the second end.

In yet another embodiment, a wrapped candy bar product includes a candy bar and a candy bar wrapper. The candy bar wrapper includes a film material including at least one film layer. The film material forms a fin seal, a first end seal, and a second end seal opposite the first end seal. The film material encloses the candy bar. The film material has a film thickness, a first film surface, a second film surface opposite the first film surface, and a primary score line. The primary score line includes a plurality of primary cut segments alternating with a plurality of primary uncut gaps, each of the plurality of primary cut segments extending through the first film surface and partially into the film material. The primary score line begins on a first side of the fin seal a first distance from an edge of the film seal, extends around the candy bar, and terminates on a second side of the fin seal opposite the first side a second distance from the edge of the film seal.

In yet another embodiment, a process of opening a wrapped candy bar product includes simultaneously breaking a candy bar into more than one piece and splitting a candy bar wrapper along a primary score line in the candy bar wrapper, where the wrapped candy bar product includes the candy bar wrapper and the candy bar wrapped by the candy bar wrapper.

Other features and advantages of the present invention will be apparent from the following more detailed description of exemplary embodiments that illustrate, by way of example, the principles of the invention.

DETAILED DESCRIPTION OF THE EXEMPLARY EMBODIMENTS

A breakable candy bar wrapper was achieved by the skip-cut scoring of the candy bar wrapper in a primary score line along one direction of the candy bar wrapper, the primary score line extending across most, but not all, of that direction of the candy bar wrapper.

The primary score line serves as a line of weakness along the candy bar wrapper. Surprisingly and unexpectedly, the primary score line of the candy bar wrapper is weak enough to break simultaneously with breakage of the candy bar in the state of a wrapped candy bar product, while the candy bar wrapper is strong enough to permit use of a flow wrapping process to wrap the candy bar with the candy bar wrapper without tearing. The scoring is preferably achieved without cutting all of the way through the film, which might compromise the barrier properties of the film and might contaminate the wrapped product.

In exemplary embodiments, secondary score lines flank the primary score line. The secondary score lines are preferably at the locations on the candy bar wrapper where the candy bar wrapper folds around the candy bar at the top edge and the bottom edge of the candy bar in the wrapped candy bar product. These secondary score lines facilitate tear initiation along the primary score line. In exemplary embodiments, the length and placement of the secondary score lines are selected in coordination with the shape of the candy bar contained within the candy bar wrapper and the locations of highest stress upon bending.

In exemplary embodiments, the candy bar wrapper includes a skip-cut score line that permits a breakage of the candy bar wrapper along the score line that occurs simultaneously with the breakage of the candy bar. In some embodiments, the minimum force to break the candy bar into two pieces is similar to the minimum force to break the candy bar wrapper along the score line of the candy bar wrapper of the wrapped candy bar product. In exemplary embodiments, the minimum force to break the candy bar into two pieces is slightly greater than the minimum force to break the candy bar wrapper along the score line of the candy bar wrapper of the wrapped candy bar product.

The breaking of the candy bar and simultaneously of the candy bar wrapper along the score line may occur by any of a number of methods, including, but not limited to, snapping and popping, twisting, bending, tensile elongation from opposing ends, or roll snapping. In some embodiments, a primary score line permits bi-directional opening, a low cost of manufacture, minimized modification (in structure and/or appearance) of existing packaging, and/or minimized modification of existing manufacturing processes and/or provides a separate function intuitive and obvious to a consumer.

Figure 1:
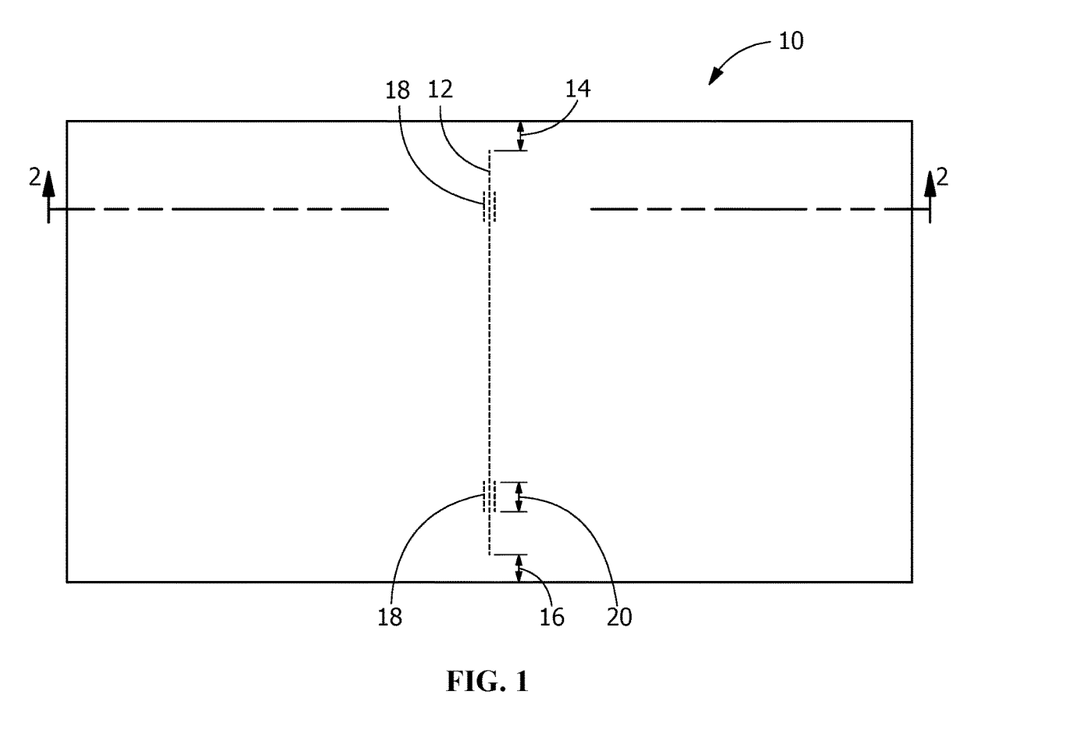
FIG. 1 schematically shows a front view a candy bar wrapper in a flattened, unwrapped state in an embodiment of the present disclosure.

Referring to FIG. 1, the candy bar wrapper 10 is generally a film structure having an overall rectangular shape, although other shapes may also be appropriate, depending on the shape of the candy bar to be wrapped. The candy bar wrapper 10 includes a primary score line 12 formed by a skip cut extending across most of the width of the candy bar wrapper 10. The primary score line 12 ends, however, short of a first end of the candy bar wrapper 10 in the width direction by a first distance 14 and short of a second end of the candy bar wrapper 10 opposite the first end by a second distance 16. An appropriate value for the first distance 14 and the second distance 16 is in the range of about 6 mm to about 12 mm, alternatively about 8 mm to about 10 mm, alternatively about 9 mm, or any value, range, or sub-range therebetween. This unscored portion of film helps to retain strength in the film web to resist tearing during manufacture.

Since the primary score line 12 extends perpendicular to the machine direction, which is the direction of travel for flow wrapping, the candy bar wrapper 10 is subject to tensile forces in the machine direction, which could potentially tear the primary score line 12. The first distance 14 and the second distance 16, however, provide unscored portions that strengthen the candy bar wrapper 10 against such tensile forces.

In some embodiments, the primary score line 12 is located substantially in the middle of the candy bar wrapper 10, as shown in FIG. 1, to provide an even breakage of the candy bar and split of the candy bar wrapper 10. In other embodiments, the primary score line 12 is located substantially away from the middle of the candy bar wrapper 10 to provide an uneven breakage of the candy bar and split of the candy bar wrapper 10.

In some embodiments, the candy bar wrapper 10 includes more than one primary score line 12, where each primary score line 12 serves as a location where the candy bar wrapper 10 may be split and separated.

The scoring may be accomplished by any of a number of incision devices, including, but not limited to, a laser, a ceramic tool, a thermal knife, or ultra-high pressure water. The scoring preferably does not extend through the film structure, thereby maintaining a film barrier and an air-tight seal around the candy bar in the wrapped state.

The candy bar wrapper 10 also includes four secondary score lines 18 also formed by scoring. The secondary score lines 18 flank and run parallel to the primary score line 12. The secondary score lines 18 have a score length 20 significantly shorter than that of the primary score line 12. The secondary score lines 18 are located on the candy bar wrapper 10 such that they extend along the thickness dimension of the candy bar in the wrapped state. In exemplary embodiments, the length of the secondary score lines 18 is longer than the thickness of the candy bar by a predetermined amount to account for potential misalignment during wrapping. An appropriate predetermined amount is in the range of about 0.5 mm to about 2 mm, alternatively about 0.5 mm to about 1.5 mm, alternatively about 0.5 mm to about 1 mm, or any value, range, or sub-range therebetween. In an exemplary embodiment, the candy bar has a thickness of about 0.25 inches (about 6.4 mm) and the length of the secondary score lines 18 is about 7 mm.

In exemplary embodiments, the scoring is by skip cutting. In exemplary embodiments, the primary score line 12 and the secondary score lines 18 include frequency scores made of intermittent, variable-length, skip-cut scoring. The skip cut depth, skip cut length, and skip cut width are selected to provide a tensile strength sufficient to resist or avoid an unintentional opening of the wrapped candy bar product prior to an intentional opening of the wrapper by the consumer. The skip cut may permit opening by the customer by any of a number of methods, including, but not limited to, snapping and popping, twisting, bending, tensile elongation from opposing ends, or roll snapping.

Figure 2:
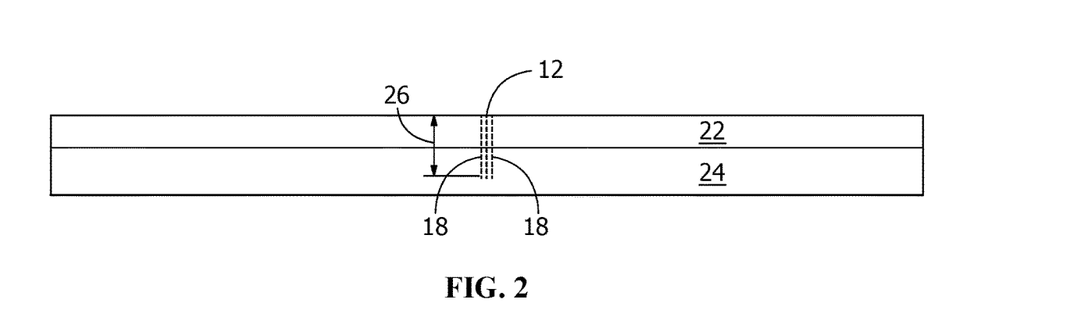
FIG. 2 schematically shows a cross sectional view along line 2-2 of the candy bar wrapper of FIG. 1.

Referring to FIG. 2, the film structure of the candy bar wrapper 10 is a film laminate that includes an outer film layer 22 facing away from the candy bar and an inner film layer 24 facing the wrapped candy bar product in the wrapped state. The primary score line 12 extends a score depth 26 into the film structure from what will be the outer surface of the wrapped candy bar product, through the outer film layer 22, and into the inner film layer 24 but not all the way through the thickness of the film structure. Similarly the secondary score lines 18 extend a similar score depth 26 into the film structure.

The film structure of the candy bar wrapper may be any number of layers in thickness, such as, for example, one, two, three, or more layers. These laminated film layers may have similar or different thicknesses from each other. In exemplary embodiments, the films are cavitated films. In exemplary embodiments, the films have a thickness in the range of about 60 gauge to about 120 gauge (about 15.2 μm to about 30.5 μm). In exemplary embodiments, the total thickness of the film structure is in the range of about 180 gauge to about 200 gauge (about 45.7 μm to about 50.8 μm). In exemplary embodiments, the score depth, the score length, and the distance of the gaps between the score cuts are sufficient to propagate a tear along the score line according to a predetermined opening feature while still providing sufficient strength to prevent tearing of the film structure during high-speed formation and processing from a web and during wrapping of a candy bar. As such, appropriate values for these parameters are dependent upon the thickness and the material properties of the film layers making up the film structure.

Figure 3:
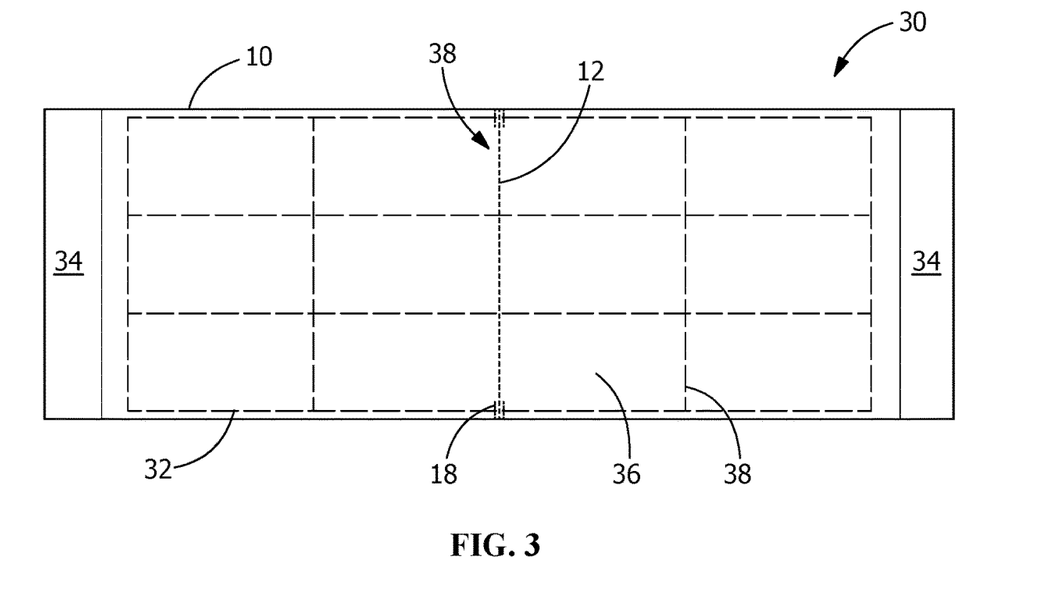
FIG. 3 schematically shows a front view of the candy bar wrapper of FIG. 1 in a wrapped state wrapping a candy bar shown in dotted lines.

Referring to FIG. 3, the wrapped candy bar product 30 includes a candy bar 32, shown in dotted lines, wrapped by the candy bar wrapper 10. In exemplary embodiments, the candy bar 32 is a chocolate bar. The candy bar wrapper 10 includes end seals 34 at the two ends in the length direction of the candy bar wrapper 10. The secondary score lines 18 are located at the top edge and the bottom edge of the candy bar wrapper 10 and candy bar 32 and may extend slightly around the front and the back of the candy bar 32 in the wrapped state.

In some embodiments, the candy bar 32 includes more than one section 36, with a break line 38 based on a region of reduced candy bar thickness that connects two sections 36 of the candy bar having a greater thickness than the reduced candy bar thickness. A 3×4 candy bar 32 with twelve total sections is shown in FIG. 3. The primary score line 12 is located at or near the location of such a break line 38 to be in registration such that when the candy bar 32 breaks at the break line 38 within the region of reduced candy bar thickness, the primary score line 12 simultaneously splits.

Figure 4:
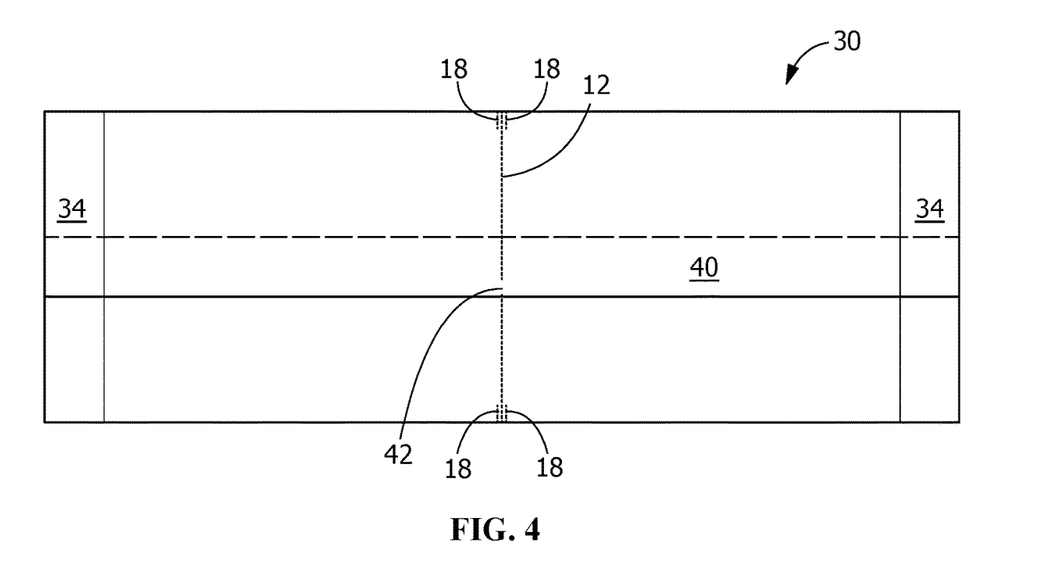
FIG. 4 schematically shows a back view of the candy bar wrapper in the wrapped state of FIG. 3.

Referring to FIG. 4, the first end of the candy bar wrapper 10 and the second end of the candy bar wrapper 10 in the width direction come together as a fin seal 40 in the wrapped state. The unscored first end and the unscored second end come together on opposite sides of the fin seal 32 in the wrapped state.

In exemplary embodiments, the primary score line 12 ends partway along the fin seal 40 of the wrapped candy bar product 30. The unscored portion 42 of the fin seal 40 increases the overall web strength of the candy bar wrapper material, which reduces breakage on the packaging equipment while still allowing the wrapper to be broken into two portions by the consumer. The unscored portion is preferably short enough to be torn apart by the consumer after splitting the wrapper along the score line.

Figure 5:
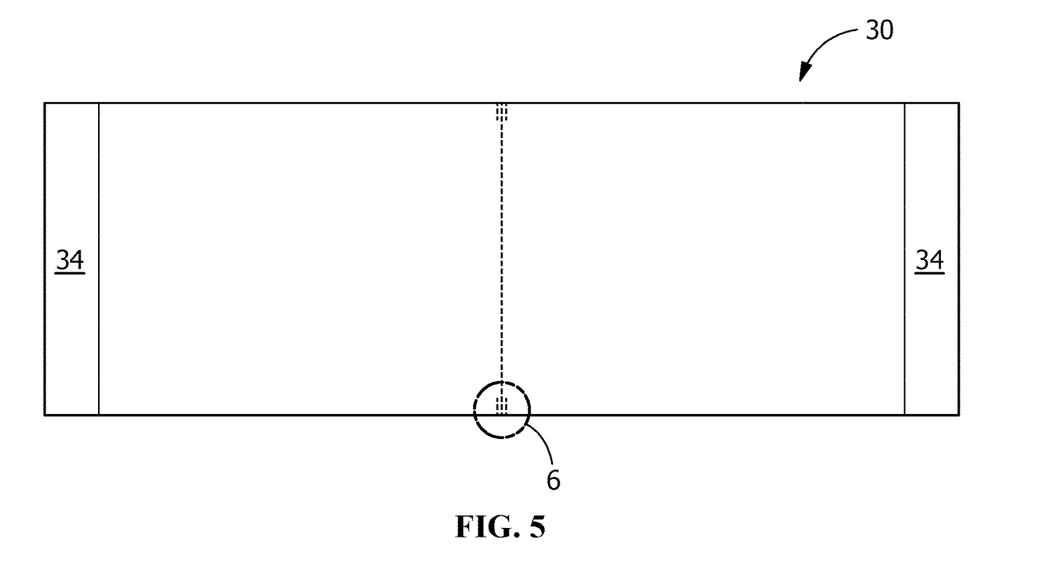
FIG. 5 schematically shows the candy bar wrapper of FIG. 3 in the wrapped state without the candy bar being shown.
Figure 6:
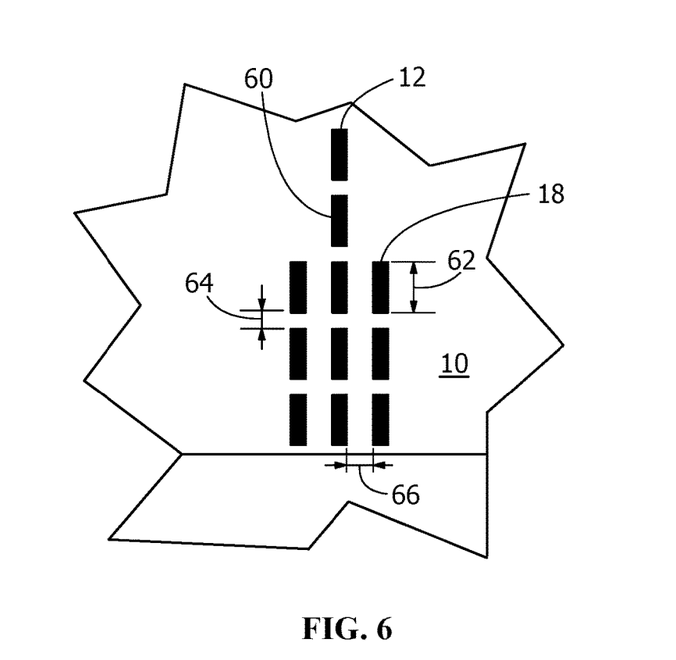
FIG. 6 schematically shows a close-up view of the edge area 6 of the candy bar wrapper of FIG. 4.

FIG. 5 shows another front view of the wrapped candy bar product 30, with the edge area 6 of FIG. 5 being enlarged and shown in FIG. 6.

Referring to FIG. 6, the primary score line 12 and the secondary score lines 18 are formed by skip cuts and include cut segments 60 separated by uncut gaps. The cut segments 60 have a segment length 62 and the gaps have a gap length 64. The secondary score lines 18 are offset from the primary score line 12 by an offset length 66.

In exemplary embodiments, the dimensions of the cut segments 60 are substantially the same for the primary score line 12 and the secondary score lines 18 and aligned with all of the gap lengths 44 being substantially all the same, as shown in FIG. 6. In other embodiments, however, the segment lengths 62 and/or the gap lengths 64 may differ between and/or within the primary score line 12 and/or the secondary score lines 18 such that the cut segments 60 of the primary score line 12 do not line up with the cut segments 60 of the secondary score lines 18.

An appropriate value for the segment length 62 is in the range of about 0.1 mm to about 1 mm, alternatively about 0.1 mm to about 0.5 mm, alternatively about 0.2 mm to about 0.9 mm, alternatively about 0.3 mm to about 0.8 mm, alternatively about 0.3 mm, alternatively about 0.4 mm, alternatively in the range of about 0.4 mm to about 0.7 mm, alternatively about 0.5 mm, alternatively about 0.5 mm to about 1 mm, alternatively about 0.6 mm, alternatively about 0.7 mm, alternatively about 0.8 mm, or any value, range, or sub-range therebetween.

An appropriate value for the gap length 64 is in the range of about 0.1 mm to about 0.5 mm, alternatively about 0.1 mm to about 0.4 mm, alternatively about 0.2 mm to about 0.3 mm, alternatively about 0.2 mm, alternatively about 0.25 mm, alternatively about 0.3 mm, alternatively about 0.3 mm to about 0.4 mm, alternatively about 0.4 mm, alternatively about 0.4 mm to about 0.5 mm, alternatively about 0.5 mm, or any value, range, or sub-range therebetween.

An appropriate value for the offset length 66 is in the range of about 0.1 mm to about 1 mm, alternatively about 0.1 mm to about 0.9 mm, alternatively about 0.3 mm to about 0.7 mm, alternatively about 0.3 mm, alternatively about 0.4 mm, alternatively in the range of about 0.4 mm to about 0.6 mm, alternatively about 0.5 mm, alternatively about 0.5 mm to about 1 mm, alternatively about 0.6 mm, alternatively about 0.7 mm, or any value, range, or subrange therebetween.

Figure 7:
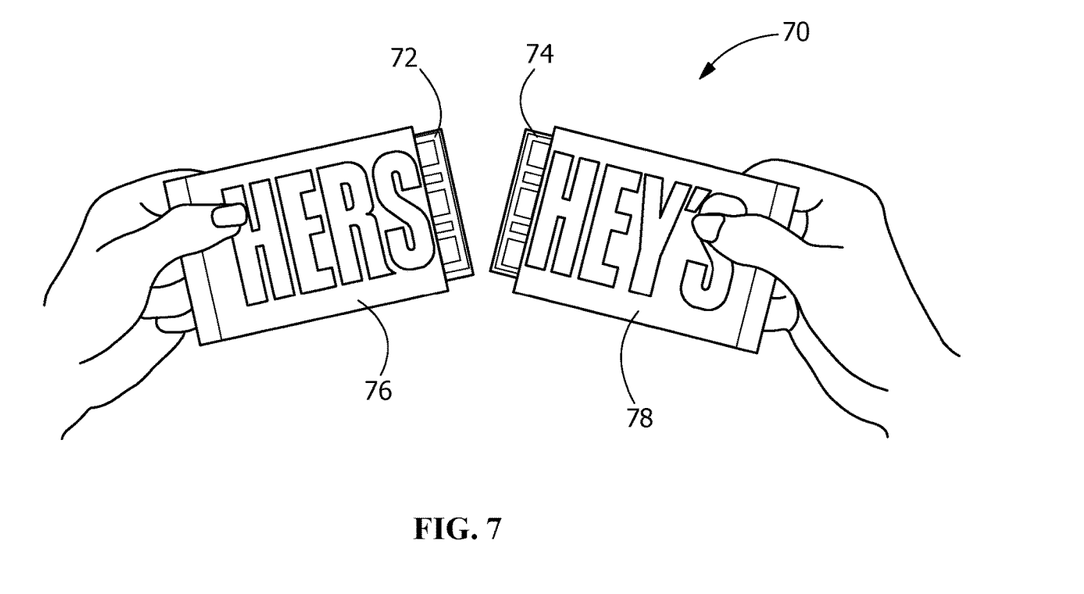
FIG. 7 shows an opened candy bar product.

In exemplary embodiments, a wrapped candy bar product 30 includes a candy bar wrapper 10 and a candy bar 32 wrapped by the candy bar wrapper 10. A consumer may open the wrapped candy bar product 30 by a process that includes applying a force to the wrapped candy bar product 30 to break the candy bar 32 into more than one piece while simultaneously splitting the candy bar wrapper 10 along a primary score line 12 in the candy bar wrapper 10. Referring to FIG. 7, the process results in an opened candy bar product 70 of a first candy bar portion 72 completely separated from a second candy bar portion 74 and a first candy bar wrapper portion 76 completely separated from a second candy bar wrapper portion 78, with at least most of the first candy bar portion 72 still in the first candy bar wrapper portion 76 and at least most of the second candy bar portion 74 still in the second candy bar wrapper portion 78.

Figure 8:
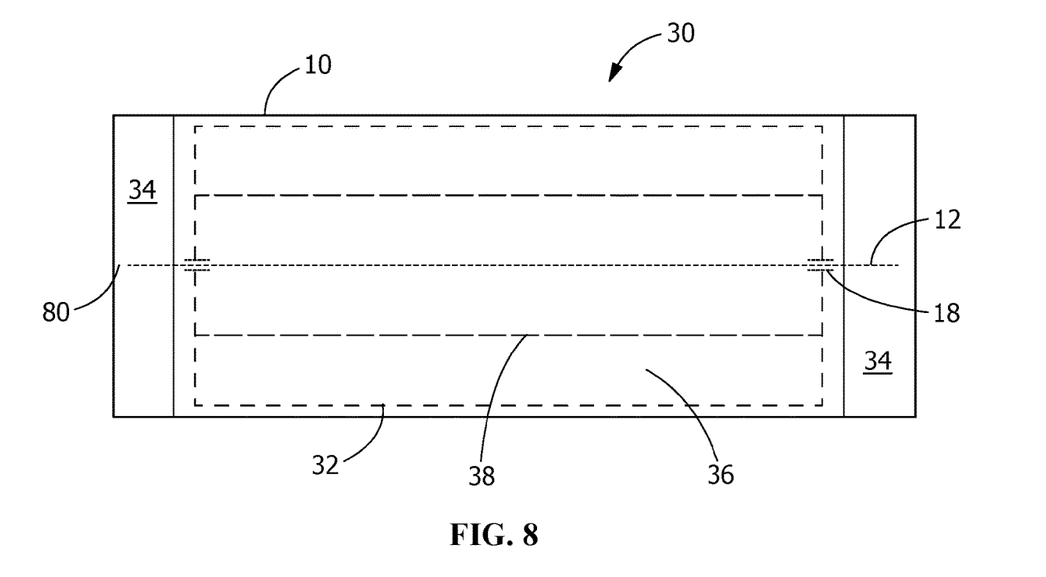
FIG. 8 schematically shows a front view of a candy bar wrapper in a wrapped state wrapping a candy bar shown in dotted lines in an embodiment of the present disclosure.

Referring to FIG. 8, the primary score line 12 may alternatively extend in the length direction of the candy bar wrapper 10 rather than in the width direction. In such embodiments, the primary score line 12 extends in the machine direction rather than perpendicular to the machine direction for flow wrapping. Rather than a single primary score line 12 extending around the candy bar 32, a primary score line 12 on the front of the candy bar wrapper 10 is distinct from a primary score line 12 on the back of the candy bar wrapper 10 in the wrapped candy bar product 30. The two primary score lines 12 preferably substantially line up with each other in the wrapped candy bar product 30.

The candy bar wrapper 10 includes end seals 34 at the two ends in the length direction of the candy bar wrapper 10. The primary score lines 12 end short of a first end of the candy bar wrapper 10 in the length direction by a first distance and short of a second end of the candy bar wrapper 10 opposite the first end by a second distance to provide unscored portions 80 at the outer edges of the end seals 34. The secondary score lines 18 are located at the left edge and the right edge of the candy bar wrapper 10 and candy bar 32 in the wrapped state.

In some embodiments, the candy bar 32 includes more than one section 36, where a break line 38 based on a region of reduced candy bar thickness connects two sections 36 of the candy bar having a greater thickness than the reduced candy bar thickness. A 4×1 candy bar 32 with four total sections is shown in FIG. 8. The primary score line 12 is located at or near the location of such a break line 38 such that when the candy bar 32 breaks at the break line 38 associated with the region of reduced candy bar thickness, the candy bar wrapper 10 simultaneously splits at the primary score line 12.

The unscored portions 80 of the end seals 34 increases the overall web strength of the candy bar wrapper material, which reduces breakage on the packaging equipment while still allowing the wrapper to be broken into two portions by the consumer. The unscored portions 80 are preferably short enough to be torn apart by the consumer after splitting the wrapper along the primary score line 12.

Figure 9:
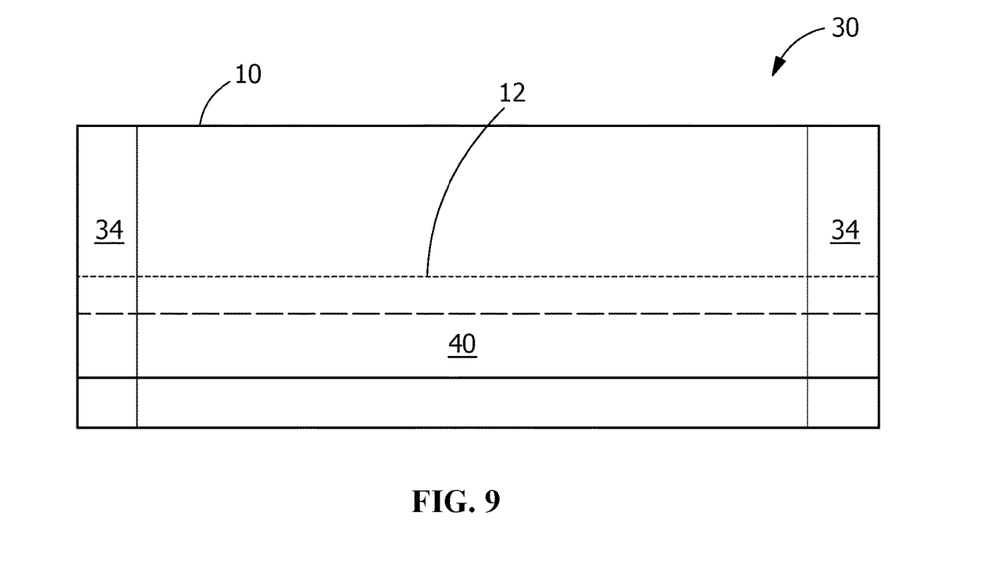
FIG. 9 schematically shows a back view of a candy bar wrapper in the wrapped state in an embodiment of the present disclosure.

Although FIG. 8 shows secondary score lines 18 and unscored portions 80, these features may be absent when the primary score line 12 runs in the direction shown in FIG. 8 and FIG. 9. With the primary score line 12 running in the machine direction, the primary score line 12 may have a greater score depth 26, extending farther into the film, without risking breakage of the primary score line 12 during flow wrapping. In such embodiments, the candy bar wrapper 10 may be free of secondary score lines 18, as shown in FIG. 9. Additionally or alternatively, the candy bar wrapper 10 may be free of unscored portions 80 at the ends of the primary score line 12, as shown in FIG. 9, without risking breakage of the primary score line 12 during flow wrapping. Alternatively, the primary score line 12 may extend to one end of the candy bar wrapper 10 but not the other, such that the candy bar wrapper 10 has an unscored portion 80 only on one end.

Still referring to FIG. 9, the first end of the candy bar wrapper 10 and the second end of the candy bar wrapper 10 in the width direction come together as a fin seal 40 in the wrapped state. The fin seal 40 is located such that the primary score line 12 does not fall on the fin seal 40. If desired, the consumer may pull the fin seal 40 apart after breaking the primary score line 12 to open the candy bar wrapper 10.

Figure 10:
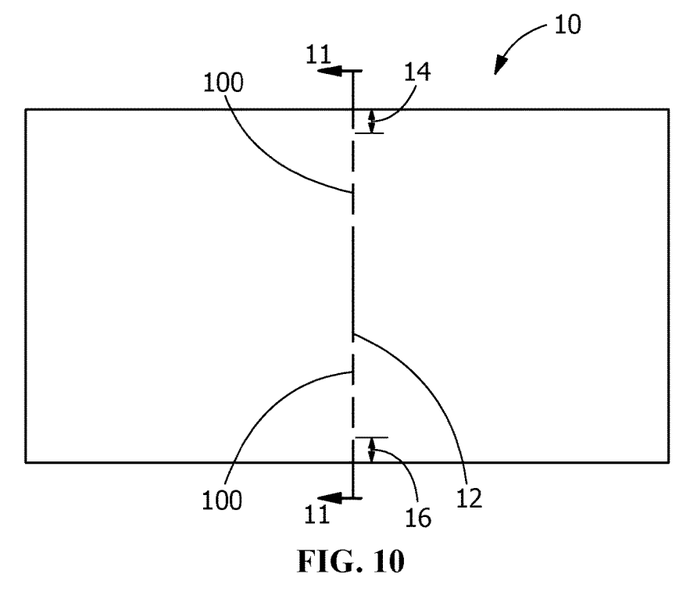
FIG. 10 schematically shows a front view a candy bar wrapper in a flattened, unwrapped state in an embodiment of the present disclosure.
Figure 11:
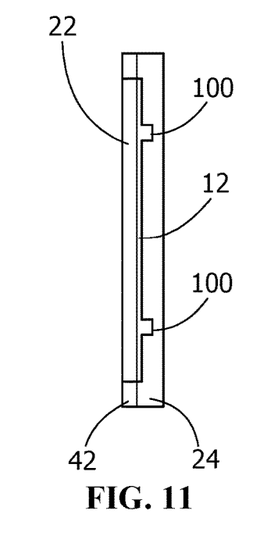
FIG. 11 schematically shows a cross sectional view along line 11-11 of the candy bar wrapper of FIG. 10.

Referring to FIG. 10 and FIG. 11, the candy bar wrapper 10 is scored with a laser score machine or other equipment capable of creating variable depth cuts. Instead of secondary score lines 18, the scoring equipment provides a secondary score 100 along the primary score line 12 that is deeper than the score depth for the remainder of the primary score line 100. The secondary scores 100 function similarly to the secondary score lines 18 and are similarly located to be at the left edge and the right edge of the candy bar wrapper 10 and candy bar 32 in the wrapped state. For simplicity, the cross sectional view of FIG. 11 schematically shows only the depth of the scores for the primary score line 12 and the secondary scores 100. These scores are preferably formed by skip cuts and include cut segments separated by uncut gaps, as described for previous scores.

Figure 12:
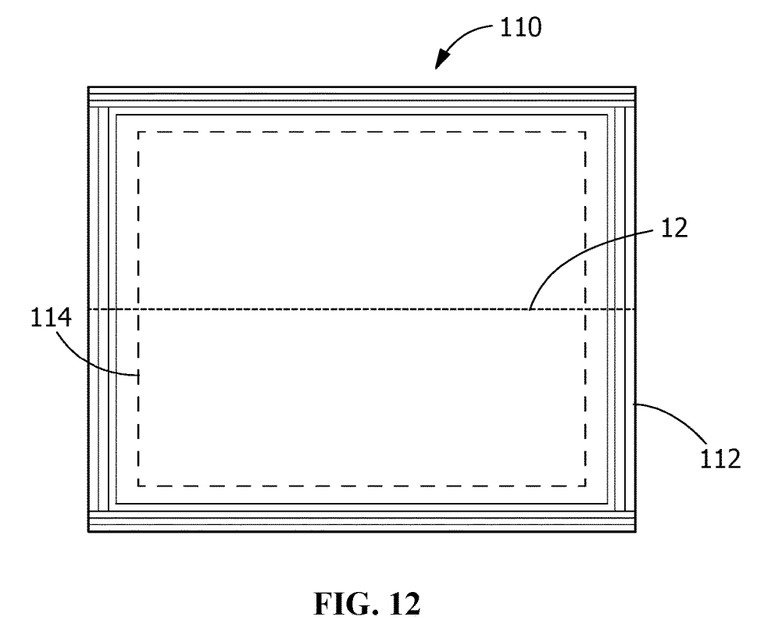
FIG. 12 schematically shows a front view of a candy bar wrapper in a wrapped state wrapping a candy bar shown in dotted lines.

Other types of packaging may also include a primary score line 12 for opening the packaging while simultaneously breaking the wrapped food. Referring to FIG. 12, the packaged food product 110 includes a food package 112 containing a packaged food 114. The food package 112 has no fin seal but is instead a pouch or sachet sealed on all four sides. The food package 112 may be made of a similar film material as in previous embodiments and includes a primary score line 12 across the food package 112 of the packaged food product 110. As in previous embodiments, the packaged food product 110 may include secondary score lines 18 and one or more unscored portions 80.

In some embodiments, the wrapped candy bar product 30 may further include a removable sealed outer package over the candy bar wrapper 10 to provide secondary protection in case the candy bar wrapper 10 is prematurely inadvertently separated along the primary score line 12.

Although the packaged food products and processes have been described primarily in terms of embodiments where the primary score line 12 has been formed by skip cuts, the primary score line 12 may be formed in any manner that provides the ability to separate the candy bar wrapper 10 simultaneously with the candy bar 32 while maintaining at least partial package coverage for portions of the candy bar 32 post-separation. The primary score line 12 preferably also maintains package seal integrity such that the packaging is not fully penetrated during manufacturing, shipping, and handling and preferably provides a clean and complete separation of portions of the wrapped candy bar product 30 by the consumer, when desired.

Figure 13:
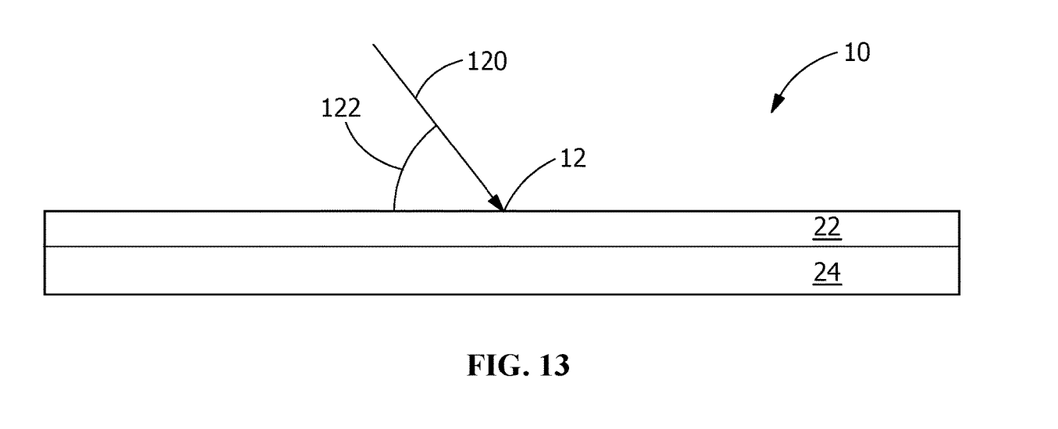
FIG. 13 schematically shows a cross sectional view of a candy bar wrapper with impinging energy forming the primary score line in an embodiment of the present disclosure.

Referring to FIG. 13, the primary score line 12 may be formed by precision incident energy 120 directed at the surface of the candy bar wrapper 10 at an angle of impingement 122. In some embodiments, the irradiation is monospectral light, multi-spectral light, ultrasonic sound waves, or irradiation.

In some embodiments, the primary score line 12 is formed by precision photo-weakening of the film structure. High-intensity, mono-spectral or multi-spectral light is focused on the surface of the film to induce controlled disruption of the moire of overlain and interlaced polymeric structures of the monolayered or multilayered resins that the structure is composed of. The light, which may be diffuse, mildly diffuse, or collimated, is metrically focused to impinge upon the surface of the film. The wavelength of the light may be infrared or ultraviolet, or any combination of visible or non-visible wavelengths. The duration and frequency of the light impinging on the film may be established based upon the response of the structure to the impingement. Inks, coatings, dispersants, and/or optical excipients may be used to amplify, nullify, or modulate the film's response to the impinging light.

In some embodiments, the primary score line 12 is formed by precision ultrasonic-weakening of the film structure. Ultrasonic sound waves are focused on the surface of the film to induce controlled disruption of the moire of overlain and interlaced polymeric structures of the monolayered or multilayered resins that the film is composed of. The ultrasonic sound waves, which may be amplitude-modulated, frequency-modulated, or both, are metrically focused to impinge upon the surface of the film. The duration and frequency of the ultrasound impinging on the target surface may be established based upon the response of the structure to the impingement. Inks, coatings, dispersants, and/or excipients may be included to amplify, nullify, or modulate the film structure's response to the ultrasonic sound waves.

In some embodiments, the primary score line 12 is formed by precision irradiation-weakening of the film structure. Irradiation is focused on the surface of the film to induce controlled disruption of the moire of overlain and interlaced polymeric structures of the monolayered or multilayered resins that the film is composed of. Irradiation-weakening, which may be dosage-modulated, is metrically focused to impinge upon the surface of the film. The duration and frequency of the irradiation impinging on the target surface may be established based upon the response of the film to the impingement. Inks, coatings, dispersants, and/or excipients may be included to amplify, nullify, or modulate the film structure's response to the irradiation.

For photo-weakening, ultrasonic-weakening, and/or irradiation-weakening, the angle of impingement 122 may be perpendicular, ±45°, circumferentially, to the film.

Figure 14:
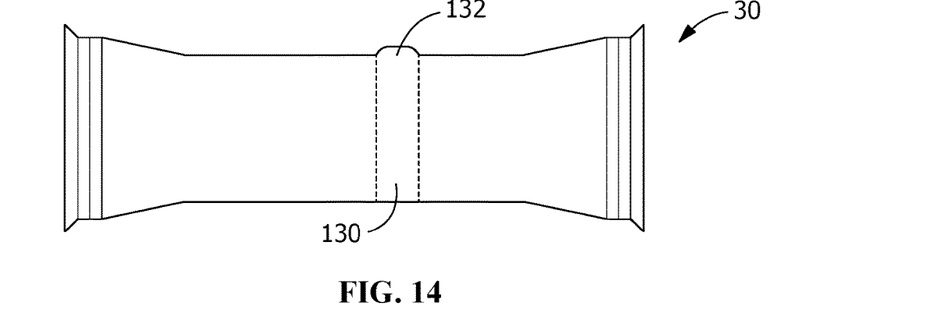
FIG. 14 schematically shows a wrapped candy bar with a tear strip in an embodiment of the present disclosure.

Referring to FIG. 14, the package separation is provided by one or more tear strips 130. The tear strip 130 may include a tab 132 to aid the consumer in initiating the tear. A tear strip 130 may be placed at a predetermined location on the film structure to facilitate controlled separation and segregation of the product and its packaging for portioning, sharing, and/or handling without direct hand-food contact. The placement of tear strips 130 may be at a single or multiple locations per package. The tear strips 130 may be lateral or longitudinal in placement. The tear-initiation force required to activate the tear strip 130 may be adjusted to meet the expectations of consumers.

For photo-weakening, ultrasonic-weakening, irradiation-weakening, and/or tear strips 130, a system over the web of film at the film manufacturing facility effects the formation of the primary score line 12 on the unprinted film in the master roll form. In some embodiments, a system over the web of film at the film converter/printer's manufacturing facility effects the formation of the primary score line 12 on the printed/coated film in the master roll form. The photo-weakening, ultrasonic-weakening, irradiation-weakening, and/or tear-strip 130 process may permit the maintenance and structure of the film's polymeric makeup so as to mitigate waste materials from the process, may permit the mitigation and/or elimination of film structure perforations that may otherwise render the film unusable for its intended purpose as a packaging material, and/or may permit the elimination of sharp-edged tooling that could present opportunities for harm to workers.

Figure 15:
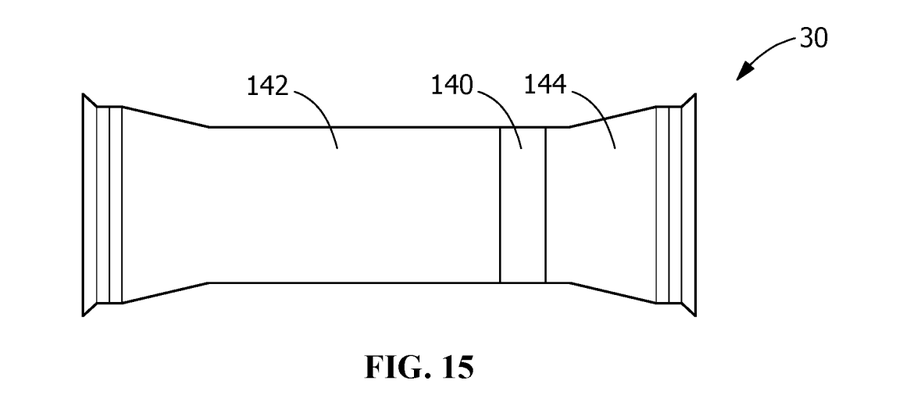
FIG. 15 schematically shows a wrapped candy bar with two-piece packaging in an embodiment of the present disclosure.

Package separation may be provided by alternative structures to a primary score line 12. Referring to FIG. 15, the package separation is provided by an adhesion/fusion bond in a two-piece packaging. An overlapping portion 140, where a first piece 142 overlaps a second piece 144, is held together by the adhesion/fusion bond. The adhesion/fusion bond may induce portioning and may facilitate controlled separation and segregation of the product and its packaging for portioning, sharing, and/or handling without direct hand-food contact. The formation of the two-piece packaging may be carried out at the film converter/printer's manufacturing facility so that they are incorporated in the film of the slit-to-web width roll form. The adhesion/fusion bond may permit the maintenance and structure of the film's polymeric makeup and/or the mitigation/elimination of film structure perforations that would render the film unusable for its intended purpose as a packaging material.

In some embodiments, the package separation is provided by an endo-skeletal structure packaging that uses a perforation-propagating paperboard construct or sleeve within the filled and sealed package. The primary score line 12 triggers when separation and segregation of the product and packaging is initiated for portioning, sharing, and/or handling without direct hand-food contact. A tubular, endo-skeletal structure presents film-disrupting edges to the inside to the film wrapper. These film-disrupting edges may be formed in paperboard, to present serration/saw-toothed, scimitar-shaped, or other film-disrupting edges as the product and package are flexed by the consumer for portioning. The packaging process may utilize a conventional packaging sourcing of the flexible film manufacturers, for the wrapping film, combined with the specialized manufacturing and sourcing of precision-designed and dimensioned paperboard, plastic, or combinations of the two materials to create a tubular, endo-skeletal structures that present film-disrupting edges to the inside of the film wrapper when the consumer flexes the product and package to a 45° angle, ±25°. The specificity of the activation-flexure angle precludes premature activation of the disrupting edges mechanism. The endo-skeletal structure may permit the maintenance and structure of the film's polymeric makeup and/or the mitigation/elimination of film structure perforations that would render the film unusable for its intended purpose as a packaging material.

Figure 16:
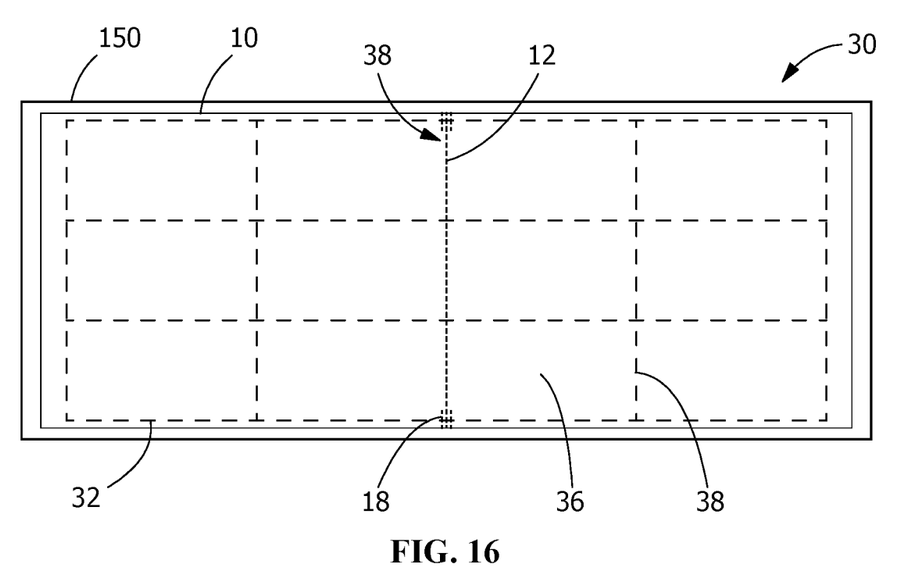
FIG. 16 schematically shows a wrapped candy bar with a barrier exo-package in an embodiment of the present disclosure.

Referring to FIG. 16, protection of a perforated end-over wrap is provided by a barrier exo-package 150, such as paperboard or plastic. The paperboard carton provides the barrier properties for product protection, combined with the candy wrapper 10 protection to avert premature activation of the perforated inner wrapper 10. The barrier exo-package 150 packaging maintains the product communication printed on the package intact even after the product has been portioned. The barrier exo-package 150 may permit the maintenance of a sealed structure that assures product protection and perforated inner wrapper performance and/or the segregation of packaging materials that facilitates post-consumer recycling efforts.

Although packaged food products and processes have been described herein primarily in terms of embodiments for a relatively thin candy bar and a candy bar wrapper, the products and methods may be used for any packaged food product that would benefit from a consumer breaking the packaging simultaneously with the food when the packaged food product is in the packaged state. Such alternative food products may include, but are not limited to, thicker candy bars, hard bar snacks, such as, for example, granola bars, especially crunchy granola bars, or any other solid food items that may be broken for sharing, either with or without one or more regions of reduced thickness defining multiple sections of the food item.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of forming a candy bar wrapper for wrapping a candy bar having a predetermined size, the process comprising:
    forming a primary score line in a film material, the primary score line extending in a predetermined direction perpendicular to an edge of the candy bar in a wrapped candy bar product, the film material comprising at least one film layer, a film thickness, a first film surface, and a second film surface opposite the first film surface; and
    cutting the film material to form the candy bar wrapper, the candy bar wrapper having a film length and a film width from a first end of the candy bar wrapper to a second end of the candy bar wrapper, the primary score line being located to permit simultaneously breaking of the candy bar and splitting of the candy bar wrapper to separate completely the candy bar wrapper into two pieces in the wrapped candy bar product.

2. The process of claim 1, wherein the primary score line extends through the first film surface and partially into the film material such that the film material maintains a film barrier.

3. The process of claim 1, wherein the forming comprises forming a plurality of primary cut segments alternating with a plurality of primary uncut gaps, each of the plurality of primary cut segments extending through the first film surface and partially into the film material.

4. The process of claim 1, wherein the forming locates the primary score line such that the primary score line begins a first distance from the first end and terminates a second distance from the second end of the candy bar wrapper.

5. The process of claim 4, wherein the first distance and the second distance are in the range of about 6 mm to about 12 mm.

6. The process of claim 1, wherein the forming comprises skip cutting.

7. The process of claim 6, wherein the skip cutting forms intermittent, variable-length frequency scores in the film material.

8. The process of claim 7, wherein the intermittent, variable-length frequency scores have a segment length in the range of about 0.1 to about 1 mm and are separated by a gap length in the range of about 0.1 to about 0.5 mm.

9. The process of claim 1, wherein the forming comprises a method selected from the group consisting of photo-weakening, ultrasonic-weakening, and irradiation-weakening.

10. The process of claim 1 further comprising forming secondary score lines in the film material, the secondary score lines flanking and extending parallel to the primary score line, the secondary score lines being located to extend around ends of the candy bar in the wrapped candy bar product.

11. The process of claim 10, wherein the forming secondary score lines comprises forming a plurality of secondary cut segments alternating with a plurality of secondary uncut gaps, each of the plurality of secondary cut segments extending through the first film surface and partially into the film material.

12. The process of claim 10, wherein the secondary score lines comprise four secondary score lines.

13. The process of claim 10, wherein a length of each of the secondary score lines is selected to extend across a thickness of the candy bar.

14. The process of claim 10, wherein the secondary score lines are offset from the primary score line by an offset length in the range of about 0.1 to about 1 mm.

15. The process of claim 1, wherein the primary score line has a line length and a line depth selected such that a minimum force to break the candy bar into two pieces is greater than a minimum force to split the candy bar wrapper along the primary score line of the candy bar wrapper of the wrapped candy bar product such that the candy bar wrapper breaks along the primary score line of the candy bar wrapper simultaneously with a breaking of the candy bar.

16. The process of claim 1, wherein the primary score line of the candy bar wrapper is located on the candy bar wrapper to split with a breaking of the candy bar along a region of reduced thickness of the candy bar between a first section and a second section of the candy bar.

17. The process of claim 1, wherein the process is a web process.

18. The process of claim 17, wherein the primary score line extends perpendicular to a machine direction of the web process.

19. The process of claim 1, wherein the film material is a cavitated film material.

20. The process of claim 1, wherein the film material is a laminate, the at least one film layer comprising an outer film layer and an inner film layer.

21. The process of claim 1, wherein the film thickness of the film material is about 180 gauge to about 200 gauge.

22. The process of claim 1, wherein each layer of the at least one film layer has a thickness in the range of about 60 gauge to about 120 gauge.

23. The process of claim 1, wherein the primary score line of the candy bar wrapper is located on the candy bar wrapper to split with a breaking of the candy bar along a region of reduced thickness of the candy bar located between a first section and a second section of the candy bar.

24. The process of claim 1, wherein the candy bar is a chocolate bar.

25. The process of claim 1 further comprising wrapping the film material around the candy bar by bringing the first end and the second end of the candy bar wrapper together to form a fin seal, forming a first end seal, and forming a second end seal opposite the first end seal, such that the film material encloses the candy bar.

26. The process of claim 25, wherein the primary score line begins on a first side of the fin seal a first distance from an edge of the film seal, extends around the candy bar, and terminates on a second side of the fin seal opposite the first side a second distance from the edge of the film seal, the first distance and the second distance providing an unscored portion of the fin seal.

27. The process of claim 26, wherein the primary score line of the candy bar wrapper is located on the candy bar wrapper to split with a breaking of the candy bar along a region of reduced thickness of the candy bar located between a first section and a second section of the candy bar.

28. The process of claim 27 further comprising forming secondary score lines in the film material, the secondary score lines flanking and extending parallel to the primary score line, the secondary score lines being located to extend around ends of the candy bar in the wrapped candy bar product.

29. The process of claim 28, wherein the candy bar is a chocolate bar.

* * * * *